A. ROSS.
MIXER AND EGG BEATER.
APPLICATION FILED FEB. 1, 1913.
1,185,004.
Patented May 30, 1916.
4 SHEETS—SHEET 4.
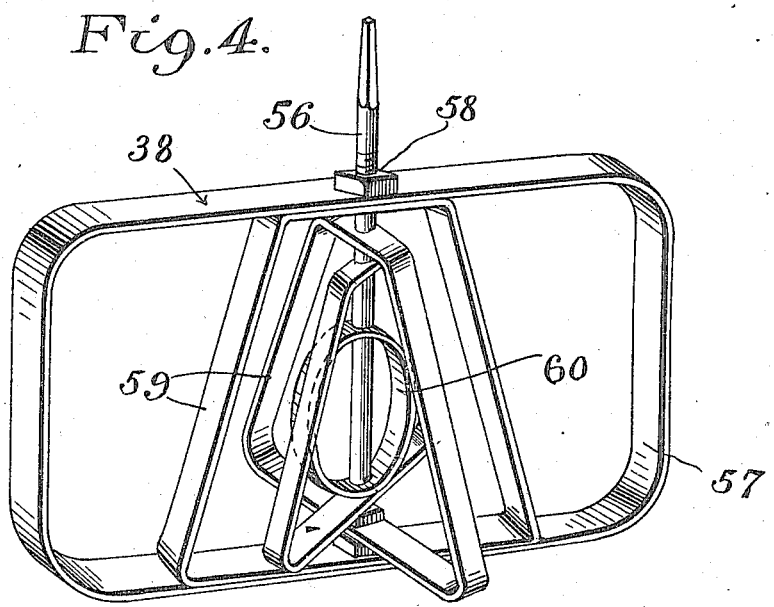
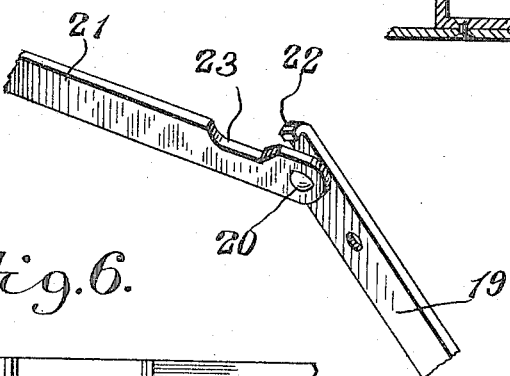
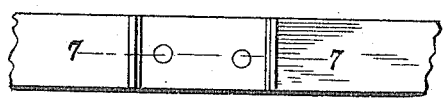
Witnesses:
Inventor,
Antonio Ross.
By
Attorney

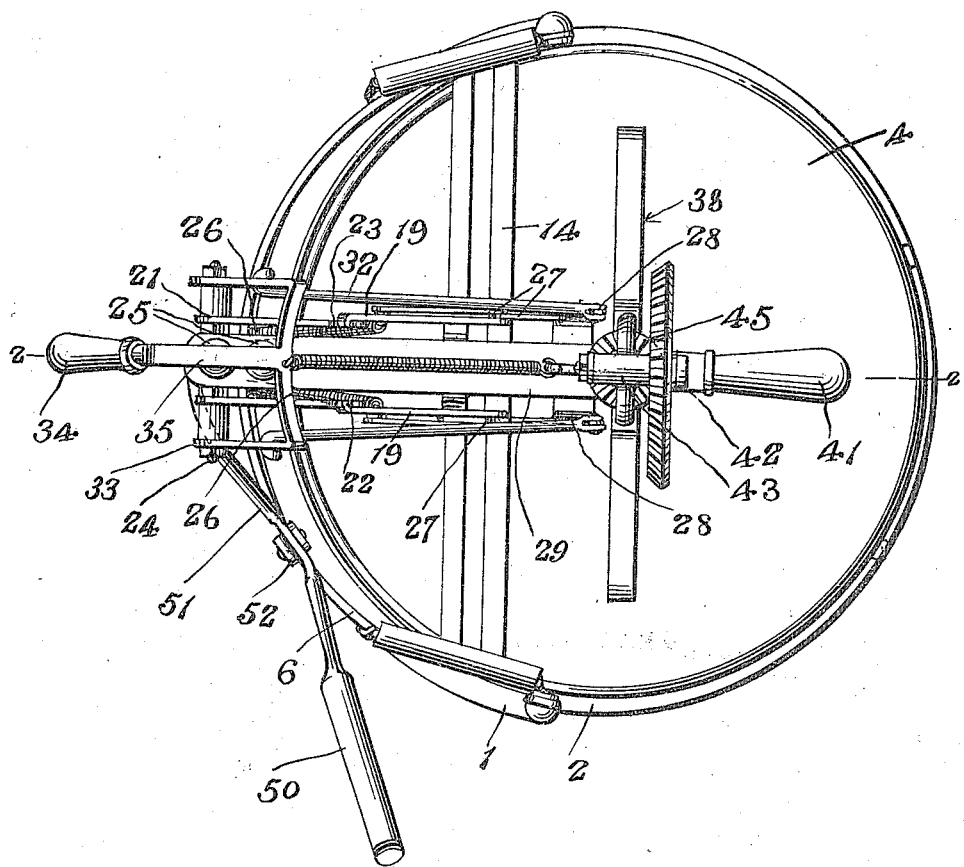

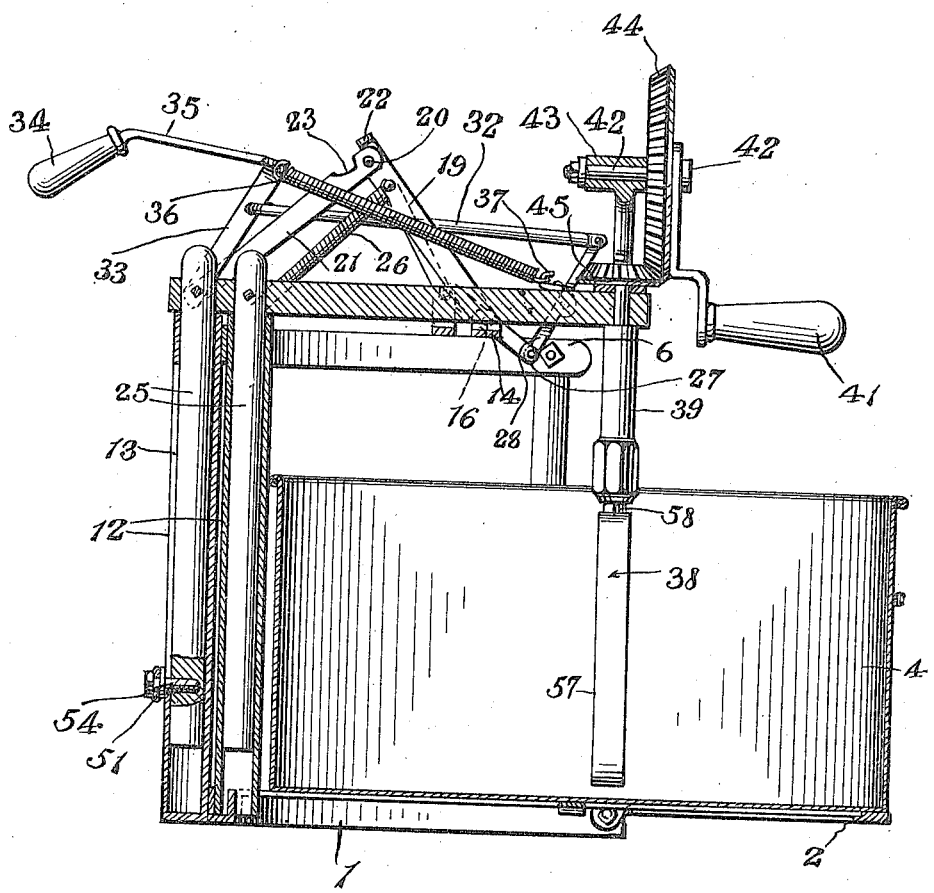

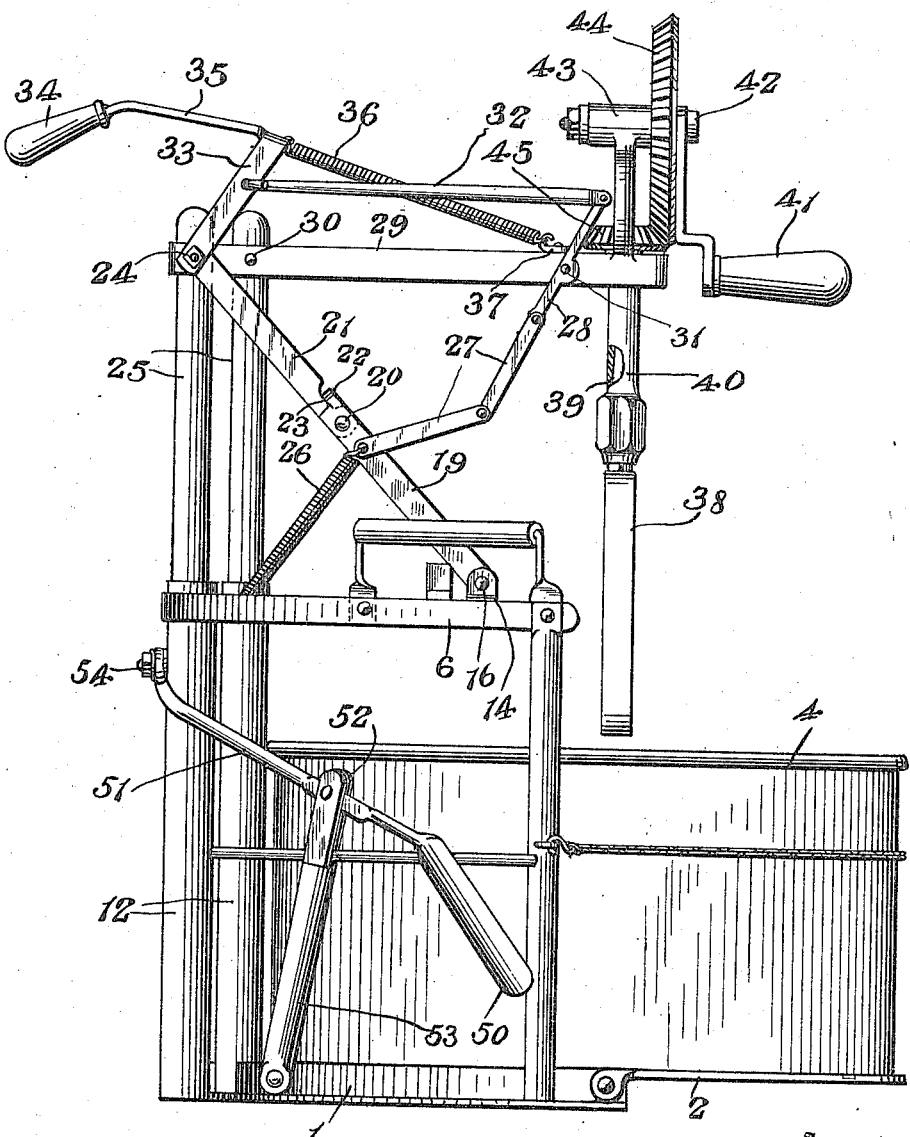

UNITED STATES PATENT OFFICE.

ANTONIO ROSS, OF UTICA, NEW YORK, ASSIGNOR OF ONE-HALF TO ANTONIO D'AGOSTINO, OF UTICA, NEW YORK.

MIXER AND EGG-BEATER.

1,185,004. Specification of Letters Patent. Patented May 30, 1916.

Application filed February 1, 1913. Serial No. 745,632.

*To all whom it may concern:*

Be it known that I, ANTONIO ROSS, of the city of Utica, county of Oneida, and State of New York, have invented an Improved Mixer and Egg-Beater; and I do hereby declare the following description and accompanying drawings are sufficient to enable any person skilled in the art or science to which it most nearly appertains to make and use my said invention or improvements.

This invention comprehends certain new and useful improvements in mixing machines and has for its primary object to provide an improved form of rotary mixer which may be employed for various purposes, and which will be of extremely simple construction and operation, as well as highly efficient in use.

Another object is to provide a device of this character which will be constructed in such manner that the operating parts thereof may be readily raised and lowered and locked in either position, as desired.

A further object is to provide improved and novel means for raising and lowering the operative parts of the mixer and automatically locking the same in either raised or lowered position.

A still further object of this invention is to provide a device of this character which will be constructed in such manner as to form a support for a mixing vessel which may be readily placed in position or removed when the operative parts of the mixer are in raised position.

This invention has for a still further object to generally improve and simplify the construction and operation of devices of this character and increase the efficiency thereof without materially increasing the cost of the same.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which—

Figure 1 is a top plan view of the complete device with all the parts in their lowermost positions, Fig. 2 is a cross sectional view on the line 2—2 of Fig. 1, Fig. 3 is a side elevation of the complete device with the parts in raised position, Fig. 4 is an enlarged detail perspective view of the mixer proper, Fig. 5 is a detail perspective view of one of the locking joints broken, Fig. 6 is a fragmentary detail view, showing a plan of one of the guide members for the locking joints, and Fig. 7 is a detail sectional view on the line 7—7 of Fig. 6.

Referring in detail to the drawings by numerals, 1 designates the base member and projecting upwardly from the opposite corners of the base 1 are the standards 5 which are connected at their upper ends by the semi-circular frame member 6 above the semi-circular base member 1.

It will be understood that the base 1, and parts connected therewith, as described above, may be formed of metal, as shown, or of any other suitable material.

Positioned at the center of the semi-circular base member 1 and extending upwardly are the hollow tubular members 12 which are preferably parallel to one another and positioned one forwardly of the other, as clearly shown in the drawings. The central portion of the frame member 6 is secured between the tubular members 12, adjacent the upper ends thereof. The outer or rear tubular member 12 is provided with a longitudinal elongated slot 13 extending preferably its entire length, and the purpose of which will presently appear.

The opposite ends of the substantially semi-circular frame member 6 are connected by the transverse bracing bars 14, and the transverse bracing bar 14 carries the brackets 16. The lower sections 19 are pivoted at 20 to the upper sections 21 and are provided with the reduced bent extremities 22 for engaging in the locking recesses 23 in the said sections 21 to limit the movement of said sections 19 and 20 in one direction and lock said sections in alinement.

The lower free extremity of the section 19 of each lock or knuckle joint 20 is pivoted to one of the brackets 16, while the upper free extremity of the section 21 of each lock or knuckle joint 20 is rigidly mounted upon the shaft 24 secured transversely through the upper end of the outer vertically movable post 25, it being understood that two posts 25 are provided and slidably or telescopically engaged in the tubular members 12, said posts 25 being of such length that when in their lowermost position, the upper ends thereof project above the upper open ends of said tubular members 12. The lock or knuckle joints 21 are resiliently retained in normal or locked position by means of the helical springs 26 which have their lower ends secured to the frame member 6 in any suitable manner, while their upper ends are secured to the lower sections 19 of said lock or knuckle joints 20, adjacent the upper ends thereof, as clearly shown in Fig. 3. Sectional joint breaking arms 27 are also pivoted to the lower sections 19 of the lock or knuckle joints 20, adjacent the upper ends thereof, and also pivoted to the levers 28 employed for operating the joints breaking arms 27, as will be later clearly understood.

The levers 28 are positioned upon opposite sides of the forwardly extending horizontal beam 29 which is mounted at its rear end upon the upper ends of the vertically movable posts 25, previously mentioned, it being understood that the beam 29 is provided with suitable openings to accommodate said posts, movement of the outer post 25 through the beam 29 being prevented by the shaft 24, previously mentioned, and which extends transversely through the beam 29 as well as said outer post 25. Movement of the forward or inner post 25 through the beam 29 is prevented by the fastening member 30 engaged transversely through said beam 29 and said forward or inner post 25, as clearly shown in the drawings. It will therefore be seen that the beam 29 is held rigid with the vertically movable posts 25 and extends forwardly from the same, the forward or free end of said beam extending over the center of the mixing vessel 4.

The levers 28 are pivoted intermediate their ends upon the pivot pin 31 extending transversely through the forward portion of the beam 29 and said levers are adapted to be swung upon said pivot pin in one direction, by means of the operating rods 32 which are pivoted at one end to the free ends of said levers 28 and connected at their opposite ends to the arms of the U-shaped member 33 carried by the shaft 24 and extending at right angles to the same, said members 33 being adapted to be operated by the operating handle 34 which is connected to the main portion of said member 33, by the connecting bar 35. The member 33 is resiliently retained in normal position by the helical spring 36 which has one end connected with the free end of said member 33, while the opposite end of said spring is connected with the bracket 37 secured to the beam 29, a spaced distance from the free or forward end thereof.

After the mixing vessel 4 has been placed in position upon the base member 1 and base extension 2, the handle 34 is pressed downwardly to swing the member 33 and shaft 24. This will draw rearwardly the operating rods 32 and thereby swing the levers 28 upon the pivot pin 31 to cause the sectional joint breaking arms 27 to pull upwardly and forwardly upon the upper portions of the lower sections 19 of said lock or knuckle joints 20, against the tension of the springs 26, thereby breaking the joints and allowing the beam 29 and rods 25 to move downwardly by gravity owing to the weight of said beam 29 and rods 25 and the parts carried thereby. This downward movement of the parts will place the mixing member proper 38 mounted upon the shaft 39, in proper position in the center of the mixing vessel 4. The shaft 39 is rotatably mounted in the sleeve 40 positioned vertically through the forward free end of the beam 29 and said shaft 39 and mixing member 38 may be readily rotated by operating the handle 41 upon the stub shaft 42 positioned in a suitable bracket 43 also carried by the beam 29, said stub shaft 42 and the shaft 39 being connected by intermeshing gears 44 and 45 carried by said shafts 42 and 39 respectively.

When it is desired to remove the mixing vessel 4 from upon the base member 1 and base extension 2 and the supporting bars 11 connecting same, it is simply necessary to press downwardly the enlarged or handle end 50 of the raising lever 51, which is fulcrumed intermediate its ends upon the fulcrum pin 52 extending transversely through the bifurcated upper end of the pivoted lever supporting member 53, which has its lower end pivotally connected to the semi-circular base member 1. By moving the lever 51 in this manner, the free end thereof mounted upon the bolt 54, will be forced upwardly, thereby forcing the bolt 54 to move upwardly in the guide slot 13 of the outer or rear tubular member 12 and as said bolt 54 is secured in the rear or outer post 25, both of the vertically movable posts 25 as well as the beam 29 and parts mounted thereon will be forced to move upwardly to the position shown in Fig. 3, when the lock or knuckle joint sections 19 and 21 will be brought into alinement and thereby cause said joints to automatically lock and prevent downward movement of the parts without operation of the handle 34 and U-shaped member 33, as previously described, to break the joints 20. Further it will be readily seen that as the lever supporting member 53 is pivoted at its lower end, said member will readily swing upon its lower end, during operation of the lever 51 in either direction.

While I have shown means for raising and automatically locking in raised position, the rotary member or mixer proper of the mixing machine and including novel means for releasing the locking means to allow the parts to descend to normal position, it will be understood that this mechanism may be employed in connection with various other machines and is therefore not limited to use in connection with mixing machines and the like.

While any suitable form of mixing member 38 may be employed, I have shown a mixing member 38 consisting of a stem 56 having its upper extremity adapted for removable engagement with the shaft 39, while the main portion of said stem 56 has mounted thereon a substantially rectangular agitating member 57 which is preferably locked for rotation with the stem 56 by nuts 58 or the like threaded upon said stem and bearing against the upper and lower longitudinal portions of said agitating member 57. Within the agitating member 57 and loosely mounted upon the stem 56 are a plurality of substantially triangular agitating members 59 of different sizes and adapted for independent rotation within one another. Within the smallest or inner triangular agitating member 59 is a substantially small agitating member 60 of substantially oval form which is also loosely mounted upon the stem 56. It will be understood that the lower portion of each agitating member is preferably spaced above the corresponding portion of the agitating member within which the same is positioned, to permit free rotation of each and every agitating member. It will also be understood that the upper portion of each substantially triangular agitating member 59 is preferably flattened and thereby increasing the width of the upper ends of said agitating members 59. Upon rotation of the shaft 39 to revolve the stem 56, all of the agitating members carried by the latter will be caused to rotate freely and thereby thoroughly agitate and mix the contents of the mixing vessel 4, as will be readily understood.

While I have shown and described the preferred embodiment of my invention, it will be understood that minor changes in construction, combination and arrangement of parts may be made without departing from the spirit and scope of the invention as claimed.

What is claimed is:—

1. A mixer and egg beater including a beam, means connected with the beam for supporting the same, means for supporting the beam supporting means, means for raising the beam supporting means, means for locking the beam supporting means in a raised position, means for releasing the locking means, and an agitator carried by the beam.

2. A mixer and egg beater including a base, a tubular member carried by said base, a mixing vessel supported by the base, a post slidably mounted in the tubular member, a beam carried by the post and projecting over the mixing vessel, mixing mechanism carried by the beam, means for raising and lowering the post and beam, means for locking the post and beam in a raised position and means for releasing the locking means.

3. A mixer and egg beater including a base, a frame mounted upon the base, a mixing vessel supported by the base, a tubular member mounted in said frame, a post slidably engaged in said tubular member, a lock joint section carried by the said post, a lock joint section carried by the said frame, said lock joint sections being connected and adapted to move to operative position upon upward movement of said post, a beam carried by said post, a lever mounted on said beam, connections between the lever and the lock joint section carried by the frame, means for raising the post, means for operating the lever to move the lock joint sections to their inoperative position and permit downward movement of said post and an agitator carried by the beam.

4. A mixer and egg beater including a base, a frame mounted upon said base, a mixing receptacle supported by the base, a tubular member mounted in said base, a post mounted in said tubular member, a beam carried by said post, means for raising the post and beam, lock joints carried by the post and frame and adapted to automatically lock the post and beam in raised position, means for resiliently retaining the lock joints in operative position, means for breaking the lock joints and an agitator carried by the beam.

5. A mixer and egg beater including a base, a tubular member carried by the base, a post mounted in said tubular member, means for moving the post upwardly in said tubular member, a beam carried by said post, means for locking the post in raised position, a lever connected with said locking means, means for operating the lever to move the locking means to inoperative position, means for resiliently retaining the locking means in operative position, means for resiliently retaining the lever operating means against movement and an agitator carried by said beam.

6. A mixer and egg beater including a base, an upstanding member secured to the base, a vertically movable member telescopically connected with said upstanding member, a forwardly directed member carried by said vertically movable member, means for forcing the vertically movable member upwardly, means for locking the vertically movable member in its uppermost position, means connected with the last mentioned means for releasing the vertically movable member to permit downward movement of the same, and an agitator carried by the vertically movable member.

7. A mixer and egg beater of the class described including an upstanding member, means for supporting said upstanding member, a movable member telescopically connected with said upstanding member, a lock joint connected with said movable member and the supporting means for the upstanding member, means for forcing the movable member upwardly or outwardly, said lock joint being adapted to lock the movable member in its uppermost or outermost position, means connected with the last mentioned means to release the movable member and allow the same to move downwardly or inwardly and an agitator carried by the movable member.

8. A mixer and egg beater including a base, a tubular member carried by said base, a post engaged in said tubular member, means for forcing said post outwardly, with respect to the tubular member, a second tubular member, a second post mounted in said tubular member, a beam carried by said posts, a frame connected with the tubular members at the base, means connected with said frame and one of the posts for locking the posts in their outermost position, means for releasing said posts to permit them to move inward and an agitator carried by the said beam.

9. A device of the class described comprising the combination with a base, and a mixing member; of a beam, a rotary member mounted in said beam, said mixing member being adapted to be secured to the rotary member, means mounted upon the base to support the beam in spaced relation with the same, means for locking the beam in its outermost position, and means for releasing the locking means.

10. A device of the class described comprising the combination with a base and a mixing member; of tubular members carried by said base, posts slidably engaged in said tubular members, a beam carried by said posts, a rotary member mounted in said beam, said mixing member being removably engaged upon said rotary member, a frame connected with said base and said tubular members, a joint member carried by said frame, a joint member carried by one of said posts and connected with the first mentioned joint member, means for resiliently retaining said joint members in normal position to lock the posts and beam in their outermost positions, means for moving the joint members to inoperative position, and means for operating the last mentioned means.

11. A device of the class described comprising the combination with a mixing vessel and a beam above the same; of a rotary member mounted in said beam, a mixing member mounted on said rotary member, said mixing member comprising a stem and a plurality of agitating members loosely mounted upon said stem and positioned within one another, means for supporting the beam above the mixing vessel, means for varying the position of the means with respect to the mixing vessel, and means for rotating said rotary member.

12. A mixer and egg beater including a base, hollow vertical standards on said base, posts slidable in said standards, a frame secured to said posts, means for raising and lowering the posts and the frame, means for locking said frame in an elevated position, means for releasing said locking means and an agitator carried by said frame.

13. A mixer and egg beater including a base, hollow vertical standards on said base, a frame slidable vertically in said standards, means for raising and lowering said frame, automatic locking means for retaining said frame in an elevated position, means for releasing said locking means, and an agitator carried by said frame.

14. A mixer and egg beater including a base, hollow standards on said base, a frame slidable vertically in said standards, means for raising said frame, means for locking said frame in an elevated position, means for releasing said locking means comprising a hand lever having pivotal connection with a series of levers and an agitator carried by said frame.

15. A mixer and egg beater including a base, hollow vertical standards on said base, a frame vertically adjustable in said standards, a series of levers adapted to be moved into alinement to lock said frame in an elevated position, means normally tending to move said levers into alinement and an agitator carried by said frame.

16. A mixer and egg beater including a base, standards on said base, a frame vertically movable on said standards, means to raise said frame, a plurality of levers pivotally connected with said frame and with said base and adapted to be moved into alinement to support said frame in an elevated position, a plurality of releasing levers pivotally connected with said first mentioned levers, a hand lever pivotally connecting said releasing levers with said frame and an agitator carried by the frame.

17. A mixer and egg beater including a base, a hand lever pivotally secured to said base, a hollow standard secured to said base, and provided with a longitudinal slot, a post slidable in said standard, a frame secured to said post, a connection between one end of said lever and said post extending through said slot, means to lock said frame in an elevated position and an agitator carried by the said frame.

In witness whereof, I have hereunto set my hand, this 24th day of January, 1913.

ANTONIO ×̲ ROSS.
<sub>his   mark.</sub>

Witnesses:
ANTONIO D'AGOSTINO,
J. J. BRADLEY.